July 2, 1935.  F. W. BIRKENHAUER  2,006,938
PIE BAKING PAN
Filed June 18, 1934
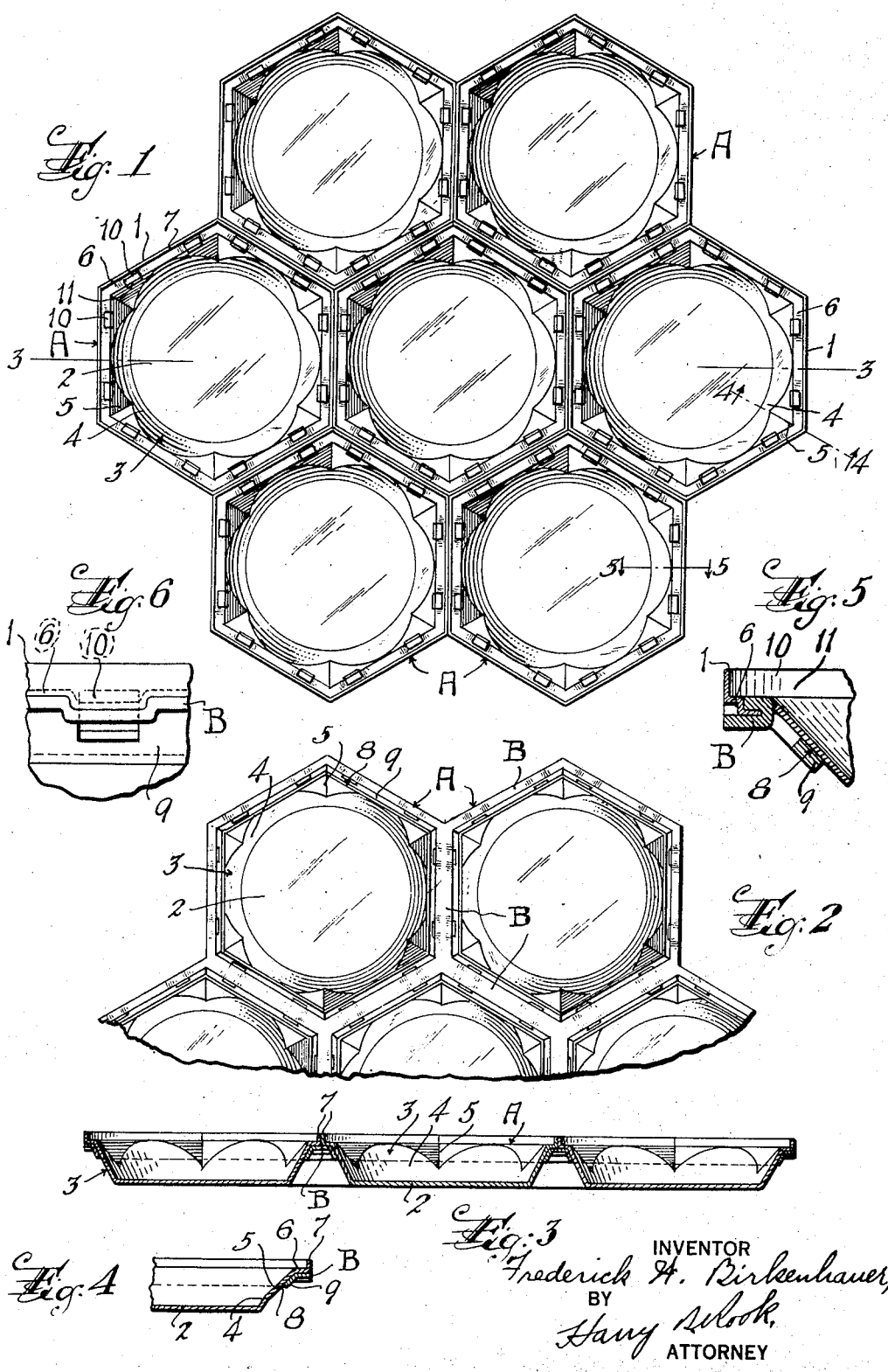
INVENTOR
Frederick H. Birkenhauer,
BY
Harry Selook,
ATTORNEY Patented July 2, 1935

2,006,938

UNITED STATES PATENT OFFICE 2,006,938

PIE BAKING PAN

Frederick W. Birkenhauer, Newark, N. J., assignor to Pie Bakeries, Inc., Newark, N. J., a corporation of Delaware Application June 18, 1934, Serial No. 731,100

8 Claims. (Cl. 53—6)

This invention relates particularly to pie baking pans comprising a plurality of pie receptacles or compartments.

In the manufacture of small pies, due to the small size and the difficulty of handling of individual pans and crusts for the pies, it has been the practice to provide a single pan with a plurality of compartments one for each pie, or to arrange a plurality of pans, one for each pie, in a frame, so that several pies can be made and handled at one time. In making the pies under this practice, the sheets of dough for the crusts are made large enough to cover all of the pie pans or compartments. In some instances the individual pans or compartments have been square as shown in my copending application Serial No. 670,668, but the corners of the pans have been rounded due to difficulty in making them angular as well as the difficulty of applying and trimming the crusts. This results in a generally square ensemble, that is, the unit including the several individual pans is square, and inasmuch as the sheets of dough from the crusts are in general circular, a considerable amount of dough is cut off in trimming. Similar difficulties arise when the individual pans are circular; and with both square and circular individual pans, considerable space is wasted in the over-all dimensions of the unit including the several individual pans because of the spaces between the pans, as well as the irregular shapes of the units. Furthermore, in such units there are spaces between the individual pans and as the result of trimming, portions of the crusts remain in these spaces and are carried to the oven and thereby become a total loss. Individual pans having the shape of a segment of a circle have been proposed, and while several such pans can be closely and efficiently arranged in a unit, the individual pies are difficult to handle and distribute and are not attractive in shape. Moreover, the individual pans are difficult to manufacture because of their shape. Furthermore, with the known polygonal shapes of the pans it is difficult to cause contact of the bottom crusts with the side walls of the pans especially at the corners, so that the crusts are not uniformly baked.

One object of my invention is to provide a multiple pie baking pan unit embodying a novel and improved construction and combination of individual pans, whereby the pans can be arranged in a frame with their adjacent side edges in direct contacting relation and without any spaces between the pans, and the area within the overall dimensions of the unit shall be efficiently and economically utilized for the reception of pies, so that the sheets of dough for the crust shall be economically used and loss of time and money incident to trimming of the crusts shall be reduced.

Another object is to provide in such a pie baking pan unit, individual pans of novel polygonal shape so that the angles formed between the sides of the various pans shall be complemental to each other to permit the pans to be arranged in close contact without spaces between them, and the pans shall include no acute angles, so that they can be easily manufactured and cleaned and the bottom crusts can be caused to snugly contact with all portions of the bottoms and side walls of the pans to ensure uniform baking of the crusts.

Other objects are to provide a multiple pan unit of this character wherein the individual pans shall be equilaterally hexagonal in plan at their top or edges and circular at their bottoms, and the side walls shall be in effect conical for a portion of their height from the bottoms to the top edges of the pans so as to reduce or eliminate angular corners in the sides adjacent the bottoms of the pans; and to obtain other advantages and results as will be brought out by the following description.

Referring to the accompanying drawing in which corresponding and like parts are designated throughout the several views by the same reference characters, Figure 1 is a top plan view of a pie baking pan embodying my invention.

Figure 2 is a fragmentary bottom plan view.

Figure 3 is a transverse vertical sectional view through the pan taken on the line 3—3 of Figure 1.

Figure 4 is a fragmentary sectional view taken on the line 4—4 of Figure 1.

Figure 5 is an enlarged fragmentary vertical sectional view taken on the line 5—5 of Figure 1, and Figure 6 is a fragmentary side elevation of the structure shown in Figure 5.

Specifically describing the illustrated embodiment of the invention the reference characters A designate individual pie pans, receptacles or compartments which are secured together to form a baking pan unit. As shown on the drawing, there are seven of the pans A, and each pan has a substantially equi-lateral hexagonal top edge 1, a circular bottom 2, and side walls 3 which flare upwardly and outwardly from the bottom. The portions 4 of the side walls adjacent the bottom of the pan are approximately frustoconical and merge into the upper portions of the side wall. As shown in Figures 1 and 4, the portions 4 of the side walls correspond in effect to the surface of a cone, while the other portions 5 of the side wall correspond in effect to the sides of an equi-lateral hexagonal pyramid. The angular relations of the portions 4 of the side walls to the bottom of the pan is less than the angular relation of the other portions 5 of the side walls, as clearly shown in Figure 4, which would be produced by the superimposing coaxially of a hollow hexagonal pyramid upon the frustum of a cone whose apex angle is less than the apex angle of the pyramid and whose base is of a diameter equal to or greater than that of an inscribed circle on the base of the pyramid, with the cone intersecting and passing through the sides of the pyramid. Such a construction obviates angular corners at the bottom of the pan and throughout a portion of the side walls thereof, so that a pie crust can be easily placed in contact with all portions of the bottom and side walls of the pan to ensure perfect baking of a crust, and there will be a minimum of accumulation of grease and foreign matter in the angular portions of the pan. Furthermore, the structure permits the easy removal of a pie from the pan, obviating the sticking of the crust in angular corners.

Each pan has a horizontal marginal flange 6 adjacent its top from which projects an upstanding perimetral flange 7 which may cooperate with rollers or other means for severing the top and bottom crusts of the pie along the edges of the pan.

Means is provided for connecting all of the pans together, and as shown this means consists of a frame B consisting of a single piece of sheet material having a plurality of openings 8, one for each pan A. The openings in the frame are arranged so that the pans are located in the same general plane in contacting relation to form an approximately hexagonal unit as shown in Figure 1 and the sides of the openings preferably have integral depending flanges 9 to snugly contact with the side walls of the corresponding pans. The pans are inserted into the openings A with the horizontal flanges 6 of the pans in contact with the frame as shown in Figures 3 and 5, and the pans are secured in the frame by tongues 10 which are struck up from the flanges 9 of the frame and are clinched through openings 11 in the horizontal flanges of the pans as shown in Figures 5 and 6.

The tops of the pans being equi-laterally hexagonal, each of at least three sides of each pan may be disposed in abutting relation to one side of another pan, and as shown, six of the pans may be arranged in surrounding relation to the seventh pan with each side of the seventh pan in contact with one side of each of the six surrounding pans. It will be observed that the angles of the tops of the pans are complemental to each other so that the pans may be arranged in directly contacting relation with no spaces between them and furthermore, the general perimetral contour of the unit including the seven pans approximates a circle. This construction and arrangement of the pans is highly advantageous in the making of a plurality of pies, one in each pan. In making the pies a single bottom crust is placed over all of the pans with its edges overhanging the flanges 7, and a similar top crust is laid over the filling of the pie with its edges also overlying the flanges 7. These two crusts may be divided into a plurality of separate crusts one for each pan and the edges of the crust may be trimmed, by squeezing the crusts between a presser such as a roller and the edges of the upstanding flanges 7 so as to cause the flanges to cut through the crusts. Inasmuch as the sheets of dough used for the crusts are generally approximately circular, it will be observed that only small portions of the sheets of dough will be lost by trimming, and the sheets will be economically utilized. There are no spaces between the pans to become clogged with pieces of trimmings and therefore there will be no loss of dough in such spaces and there is no likelihood of pieces of dough being deposited on the surfaces of the pies.

The pans have no sharp angles between the various side walls or between the side walls and the bottom so that the pans are both easy to manufacture and to fill with the pie making materials. The unit permits the crust to be rolled thin and yet conform to the contour of the unit without stretching of the crust to the breaking point, which occurs where square or circular pans are used; and obviously thin crusts are desirable as they result in more delectable pies. The pies made in the pans are attractive and symmetrical in shape and will withstand rough handling without injury.

Having thus described my invention, what I claim is:

1. A multiple baking pan comprising a plurality of separate pans each equilaterally hexagonal in plan, and a frame connecting said pans together with their top edges in a common plane and with each of at least three sides of each pan in abutting relation to one side of another pan.

2. A multiple baking pan comprising at least seven identical separate pans each equilaterally hexagonal in plan, and a frame connecting said pans together with their top edges in a common plane and with six pans surrounding the seventh, each of said six pans having one side in contact with each side of said seventh pan.

3. A baking pan having a circular bottom and upstanding outwardly flared side walls the portions of which adjacent the bottom are approximately conical and the upper edge portions of which are equilaterally hexagonal in plan.

4. A multiple baking pan comprising a plurality of separate pans each equilaterally hexagonal in plan and having a perimetral upstanding flange, and a frame connecting said pans together with the top edges of said perimetral flanges in a common plane and with each of at least three said perimetral flanges of each pan in abutting relation to one perimetral flange of another pan.

5. A baking pan having a circular bottom and upstanding outwardly flared side walls the portions of which adjacent the bottom are approximately conical and the upper edge portions of which are equilaterally hexagonal in plan, said pan having an upstanding perimetral flange.

6. A multiple baking pan comprising a plurality of separate pans each equilaterally hexagonal in plan and having a horizontal marginal flange adjacent its top and a perimetral upstanding flange projecting from said marginal flange, and a frame connecting said pans together with the top edges of said perimetral flanges in a common plane and with each of at least three said perimetral flanges of each pan in abutting relation to one perimetral flange of another pan.

7. A baking pan having a circular bottom and upstanding outwardly flared side walls the portions of which adjacent the bottom are approximately conical and the upper edge portions of which are equilaterally hexagonal in plan said pan having a horizontal marginal flange adjacent its top and a perimetral upstanding flange projecting from said marginal flange.

8. A multiple baking pan comprising at least seven identical pans each equilaterally hexagonal in plan and connected together with their top edges in a common plane and with six pans surounding the seventh, each of said six pans having one side coincident with each side of said seventh pan.

FREDERICK W. BIRKENHAUER.